(12) United States Patent
Kiselev et al.

(10) Patent No.: US 7,809,898 B1
(45) Date of Patent: Oct. 5, 2010

(54) DETECTING AND REPAIRING INCONSISTENCIES IN STORAGE MIRRORS

(75) Inventors: Oleg Kiselev, Palo Alto, CA (US); John A. Muth, Scotts Valley, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1437 days.

(21) Appl. No.: 10/847,977

(22) Filed: May 18, 2004

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .................... 711/152; 711/4; 711/111; 711/112; 711/161; 711/162; 711/202; 711/203

(58) Field of Classification Search .................. 711/141, 711/161–162, 4, 111–112, 152, 202–203; 707/204; 714/6
See application file for complete search history.

(56) References Cited

U.S. PATENT DOCUMENTS

| | | | | |
|---|---|---|---|---|
| 5,546,536 A | * | 8/1996 | Davis et al. .................... 714/20 |
| 5,592,618 A | * | 1/1997 | Micka et al. .................. 714/54 |
| 5,828,820 A | | 10/1998 | Onishi et al. |
| 6,003,044 A | * | 12/1999 | Pongracz et al. ............ 707/204 |
| 6,397,307 B2 | | 5/2002 | Ohran |
| 6,578,120 B1 | | 6/2003 | Crockett et al. |
| 6,718,436 B2 | | 4/2004 | Kim et al. |
| 6,735,603 B2 | | 5/2004 | Cabrera et al. |
| 6,842,834 B2 | | 1/2005 | Crockett et al. |
| 6,877,016 B1 | | 4/2005 | Hart et al. |
| 2003/0093633 A1 | * | 5/2003 | Thiesfeld et al. ............ 711/154 |
| 2003/0145167 A1 | * | 7/2003 | Tomita ........................ 711/114 |
| 2004/0236803 A1 | * | 11/2004 | Spiegeleer .................. 707/204 |
| 2005/0131966 A1 | * | 6/2005 | Lou ........................... 707/204 |

* cited by examiner

*Primary Examiner*—Sanjiv Shah
*Assistant Examiner*—Yaima Campos
(74) *Attorney, Agent, or Firm*—Robert C. Kowert; Meyertons, Hood, Kivlin, Kowert & Goetzel, P.C.

(57) ABSTRACT

A system and method for detecting mirror inconsistencies in a distributed storage environment. Inconsistencies between mirrors may be detected by comparing session tags among individual storage devices. Each data write may include a tag and storage devices may calculate session tags from the write tags. Additionally, a storage device may keep a history including tags from recent writes. When a client sessions ends, a metadata server may compare the respective session tags from different storage devices to determine whether the mirrors are synchronized. If the session tags do not match, the metadata server may examine the metadata histories from the storage devices to determine a cause for the discrepancy in the session tags. If examining the session histories fails to reveal the discrepancy's source, a metadata server may request individual data block checksums from storage devices to attempt a re-synchronization of the mirrored storage devices.

30 Claims, 7 Drawing Sheets

DETECTING AND REPAIRING INCONSISTENCIES IN STORAGE MIRRORS

BACKGROUND OF THE INVENTION

1. Field of the Invention

This invention relates generally to storage management, and more particularly to detecting and repairing inconsistencies among mirrored data images in distributed shared storage environments.

2. Description of the Related Art

Modern distributed shared storage environments may include multiple storage objects connected via an interconnection network. The interconnection network provides the infrastructure to connect the various elements of a distributed shared storage environment. Within the storage environment, file system abstractions may be built on top of logical volumes that may be distributed across multiple storage devices. As the number of logical volumes and file system abstractions grows, the complexity of the entire storage environment grows dramatically.

In order to limit bottlenecking and the resulting restricted data throughput, distributed shared storage environments may separate the actual storage of data from the management of that data. Storage architectures that employ this technique may be referred to as out-of-band or asymmetric systems. A metadata server (MDS) generally supplies data management and control functions including, among others, file system mapping, mirror synchronization, client authentication and access privileges. A MDS can provide this metadata to other devices, processes, and applications. The data itself can be stored on various storage devices attached to the network, but not necessarily connected directly to the MDS. Such storage devices provide data storage functions without having to worry about the metadata and file system management.

Applications, or clients, initially contact the MDS to request access to a specific file or dataset. The MDS may, after authenticating the client node and applying whatever data access policies are relevant, provide the requesting client node with information (metadata) about what storage device contains that particular dataset and with an access token to present to the storage device. Client nodes may then communicate directly with the storage device, presenting access tokens when reading or writing data. The access token, or capability, generally describes the access rights of the client, and may, through the use of digital signatures, provide proof that the access token was generated by the MDS and has not been modified.

Separating data from its associated metadata allows the actual data traffic to be routed to storage devices and therefore may prevent the MDS from becoming a bottleneck and limiting the total amount of data throughput. This architecture may also allow the MDS to be optimized for metadata lookups that usually involve smaller reads and writes, while allowing the storage devices themselves to be optimized for larger transfers of data.

One proposed type of storage device for use in shared storage environments is the object-based storage device (OBSD). OBSDs may provide clients with access to objects, frequently called user objects, comprising a logical collection of bytes on the storage device. User objects are of variable size and provide a storage abstraction that can represent application specific structures such as files, database tables, images or other media.

Systems frequently mirror file images to ensure data integrity and consistency. Other uses for data mirroring may include backing up data, distributed load sharing, disaster recovery, minimizing the damage from Trojan horses and viruses, or point-in-time analysis and reporting. A traditional mirror synchronization strategy may involve a single host device storing copies of data until all mirrors have confirmed that the data has been committed. Another traditional strategy may involve maintaining a bitmap including a logical representation of every data block in a mirrored device, and tagging the logical representation as "dirty" for each block that is written. To compare mirrors, the bitmaps from the different mirrored devices are compared to determine if any discrepancies are present. Yet another possible strategy may involve the individual mirrored devices communicating with each other to compare and copy data as needed to ensure data consistency.

SUMMARY

In storage environments, inconsistencies between mirrored storage devices may be detected by comparing session tags between individual storage devices. A client may include a tag with each mirrored write to a storage device. A write tag may be any of various types of values including, but not limited to a calculated CRC of the write data, a cryptographic hash of the write data, a globally unique random number, or in general any unique identifier. A storage device may calculate a session tag based on the individual write tags. A storage device may maintain a separate session tag for each client session. After a client sessions ends, whether normally or abnormally, a metadata server may query the session tags from the mirrored storage devices. The metadata server may then compare these session tags to determine whether the mirrors are synchronized.

In addition, a storage device may keep a history of the metadata from recent writes in each session. Such a metadata history may include the write tag for each recent write as well as other metadata. In some embodiments, a storage device may store the entire session's metadata in a history, while in other embodiments, a storage device may only store the metadata from the more recent writes of the session. In yet other embodiments, this history may only include those client writes that have not been committed to storage.

If, after a client session ends, the session tags do not match, the metadata server may request the metadata history from each of the relevant storage devices. These histories may then be examined to determine a cause for the discrepancy in the session tags. For instance, a metadata server may be able to identify a specific write that needs to be recovered for a specific storage device, or that one or more data caches for the client need to be flushed, according to one embodiment. In another embodiment, a metadata server may discover that a specific data write was corrupted for a particular storage device.

In some embodiments, a metadata server may compare session tags from time to time during the client's mirrored write session. If the session tags agree, the metadata server may then inform the storage devices to discard stored history entries whose write tags were included in the compared session tags. Such discarding of session history entries may prevent a storage device from having to store a potentially enormous number of entries that could result from the client's entire write session. The session tag may also be reset when data images are verified to be synchronized. If it is discovered that the session tags do not agree, a metadata server may quiesce the client I/O while attempting to determine and correct the cause of the inconsistency.

If a metadata server is unable to determine the cause for session tag inequality by examination of the session histories, it may then request and compare tags for individual data blocks on the storage devices to determine and correct the mirror inconsistencies. Furthermore, if the tag history is insufficient to repair inconsistencies between mirrors, a metadata server may fall back on a traditional full rebuild of mirror consistency by copying blocks from one mirror to another.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and their usage is not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
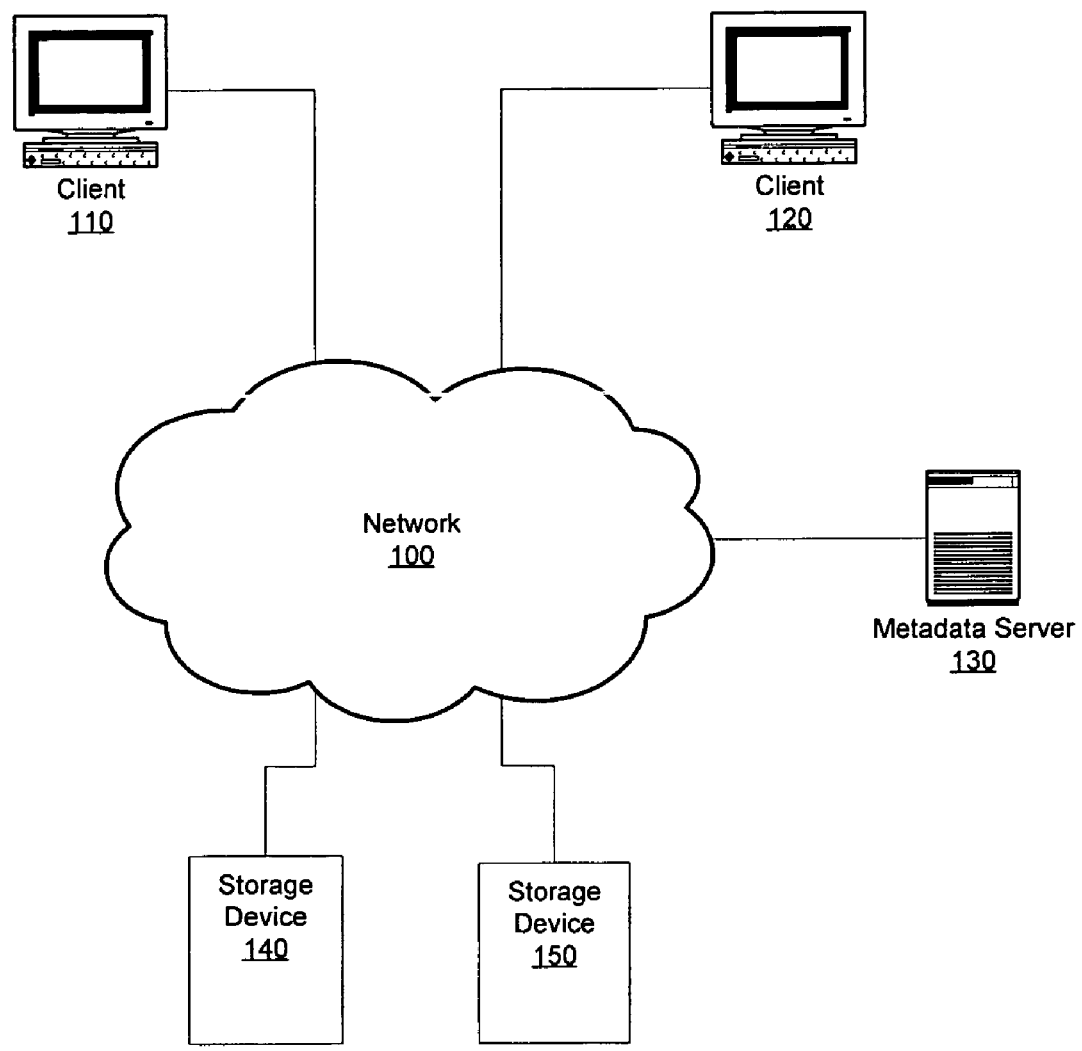
FIG. 1 illustrates, according to one embodiment, a networked system including various computer devices that may be configured to implement detection of mirror inconsistencies using tags.

FIG. 1 illustrates a computer network, according to certain embodiments, in which one or more devices may be configured to enable the detecting and correcting of mirror inconsistencies using tags. In such an embodiment, at least one computing device on Network 100 may be a client device, such as Client 110 or Client 120 with installed software that may be configured to communicate with other devices, request write access for mirroring data to storage devices, and perform data writes including tags to storage devices. In one embodiment, at least one computing device on Network 100 may be a server device, such as Metadata Server 130 with installed software that may be configured to communicate with other devices, grant write access to, request session tags and histories from, and exchange data with storage devices. Metadata Server 130 may also be configured as a client device similar to Client 110 and Client 120. According to some embodiments, one or more devices may be storage devices, such as Storage Device 140 and Storage Device 150. Storage Devices 140 and 150 may be configured to provide data storage and retrieval services to other devices, such as Client 110, Client 120 and Metadata Server 130. In yet other embodiments, the Network 100 may be implemented using a traditional shared SCSI bus to connect clients and servers to storage. In some of these embodiments communication between Metadata Server 130, Client 110 and Client 120 may be implemented over a separate interconnect, using a different networking paradigm to carry out metadata communications between these entities. In addition, in some embodiments, Storage Device 140 or Storage Device 150 may be configured to collect and store tags from mirrored data writes, calculate and maintain session tags, maintain session metadata histories and provide these tags and histories to other devices, such as Metadata Server 130.

In a distributed shared storage environment, such as illustrated by FIG. 1, inconsistencies between mirrored data images may be detected by comparing tags between individual storage devices, according to some embodiments. In one such embodiment, Client 110 may include a tag with each mirrored write to both Storage Device 140 and Storage Device 150. In some embodiments, a write tag may be a CRC of the data included in the write, while in other embodiments, the write tag may be a unique or random number, and not necessarily based or calculated as a function of the data being written. In one embodiment, the write tag may be random number generated in such as way as to guarantee that is it globally unique.

Each mirrored storage device may calculate a session tag based upon the individual write tags. A session tag may be calculated in any of a number of different ways. For example, individual write tags may be combined, or added, or used as an argument for a cryptographic hash function, or CRC function, according to various embodiments. Storage devices may cumulatively recalculate a session tag as each new write tag is received.

A storage device may maintain a separate session tag for each client session. For example, Storage Device 140 may calculate one session tag using only the write tags from Client 110, while calculating a separate session tag using write tags from Client 120. Additionally, in one embodiment, Client 110 may write data in two different sessions to different data image mirrors on a single storage device, such as Storage Device 140. In such an embodiment, Storage Device 140 may calculate a separate session tag for each session, even though the same client, Client 110, may be writing the data for both sessions.

A storage device may also keep a metadata history of recent writes in each session. Such a metadata history may include the write tag for each recent write as well as other metadata. In some embodiments, a storage device may store the entire session's metadata in a history, while in other embodiments, a storage device may store the metadata from only the more recent writes of the session. In yet other embodiments, this history may include only those client writes that have not been committed to storage and once those writes have been committed to storage they may be deleted from the history. According to some embodiments, client writes may be stored in the history for a certain amount of time based on the latency time required to ensure that the writes are committed to storage.

In yet other embodiments, Storage Devices 140 and 150 may be aware of their data mirroring relationship and periodically exchange batches of metadata information, mutually agree that their data images are consistent, and negotiate a discard of matching metadata history segments. If inconsistencies are discovered during the metadata comparison, in some embodiments the Storage Devices 140 and 150 may negotiate an exchange of data blocks to bring their data copies into consistent states. In yet other embodiments, Storage Devices 140 and 150 may inform Metadata Server 130, allowing Metadata Server 130 to deploy its standard mechanisms to recover consistency on Storage Devices 140 and 150. Alternatively, in some embodiments the Storage Devices 140 and 150 may not be able to initiate a dialog with the Metadata Server 130. For example, in a SCSI implementation the Metadata Server may be implemented as a "privileged" client and act as a SCSI initiator. Since the SCSI protocol may not allow target devices to directly interact with initiators, Storage Devices 140 and 150 may not be able to inform Metadata Server 130 about any inconsistencies. In such embodiments, Storage Devices 140 and 150 may signal the discovered inconsistency to Clients 110 and 120 by using one of a number well-known extended error signaling mechanisms. The Clients 110 or 120, in turn, may inform the Metadata Server 130 of the error, allowing Metadata Server 130 to perform repairs.

When a client sessions ends, whether normally, or abnormally, a metadata server may query the session tags from the storage devices to which the client was mirroring data. The metadata server may then compare these session tags to determine whether if the mirrors are consistent. If the session tags do not match, the metadata server may request the metadata history from each storage device. The histories may then be examined to determine a cause for the discrepancy in the session tags. For instance, according to one embodiment, Metadata Server 130 may be able to identify a specific write that needs to be recovered for Storage Device 140, or that one or more data caches for Client 110 need to be flushed.

In some embodiments, Metadata Server 130 may occasionally compare session tags during a mirrored write session. If the session tags agree, the metadata server may then inform the storage devices to discard any metadata entries in their histories that were included in the compared session tags. Calculation of the session tag may also be restarted from the point synchronization is verified. Alternatively, upon discover that the session tags do not agree a metadata server may quiesce the client I/O while attempting to determine and correct the cause of the inconsistency.

If a metadata server is unable to determine the reason why session tags do not agree by examining the metadata histories from the storage devices, the metadata server may then request and compare tags for individual data blocks on the storage devices to determine and fix the cause of the inconsistency.

A client device, such as Client 110 or Client 120, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device capable of communicating with processes or devices.

Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fibre Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models. Additionally, Network 100 may consist of several disjoint networks of different implementations, such as one Fibre Channel SAN network for communications between Client 110 and Storage Devices 140 and 150, another Fibre Channel SAN network for communication between Client 120 and Storage Devices 140 and 150, and a third network, built using TCP/IP, for communication between Metadata Server 130 and Clients 140 and 150.

A server device, such as Metadata Server 130, may be any of various types of devices, including, but not limited to, a personal computer system, desktop computer, laptop or notebook computer, mainframe computer system, handheld computer, workstation, network computer, or any type of networkable peripheral device such as storage devices, switches, modems, routers, etc, or in general any type of networkable computing device capable communicating with other processes or devices. Metadata Server 130 may be configured to couple over network 100 to one or more other devices via one or more wired or wireless network interfaces.

A storage device, such as Storage Device 140 or Storage Device 150, may be any type of networkable computing device capable communicating with and providing data storage services to other devices or processes. According to various embodiments, Storage Device 140 or Storage Device 150 may be configured to implement any of numerous data storage models including but not limited to, storage-network attach, storage-network aggregation (SNA), network attached storage (NAS), storage area network (SAN), Redundant Array of Independent (or Inexpensive) Disks (RAID), or object-based storage device (OBSD). In certain embodiments, Storage Devices 140 or 150 may be configured to implement a combination of different data storage models. Storage Devices 140 and 150 may utilize one or more of numerous types of storage media including but not limited to hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a magnetic or magneto-optical hard drive or optical storage, or a solid state non-volatile storage like flash memory and so on. The storage medium may include other types of storage as well, or combinations thereof.

Figure 2:
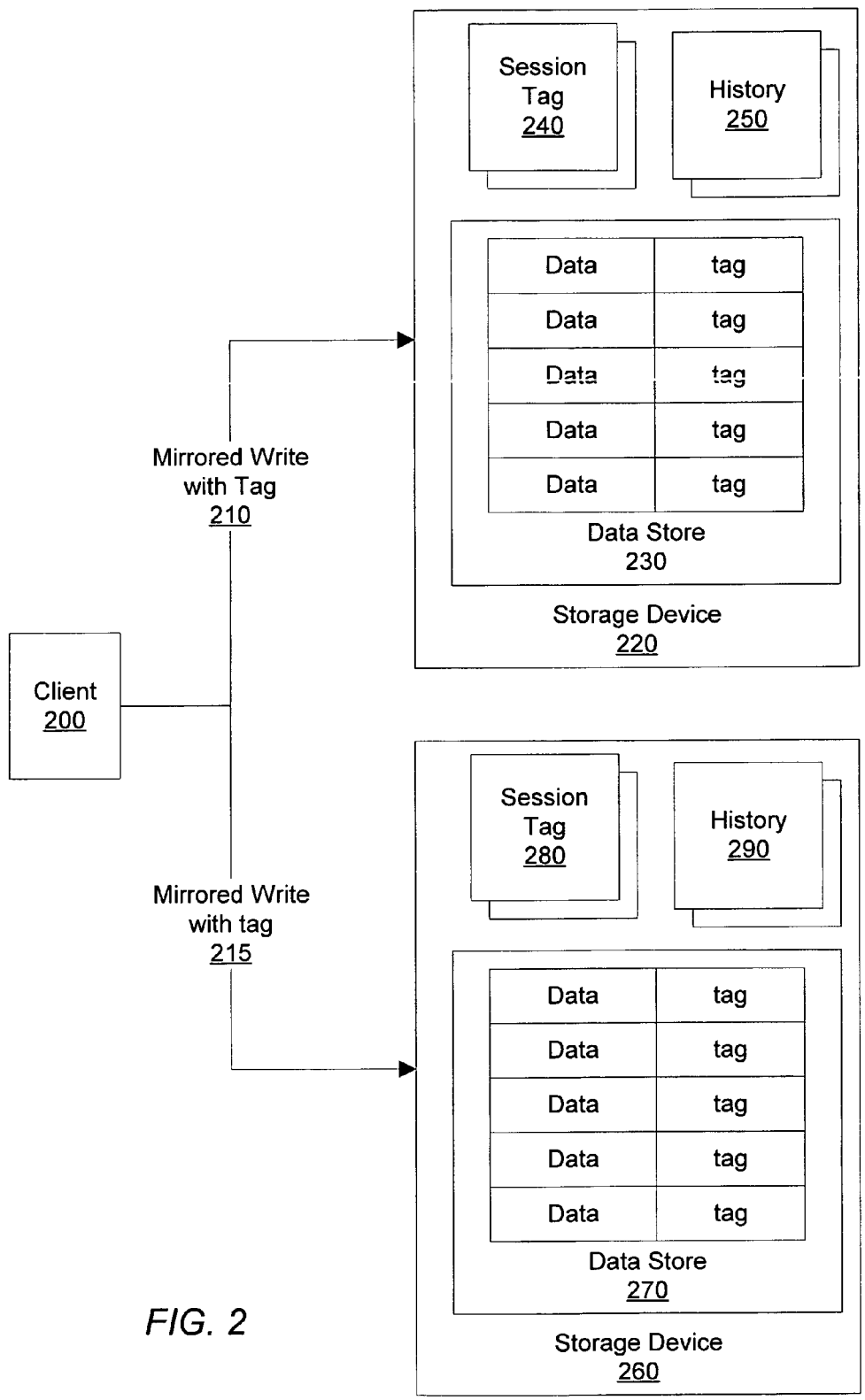
FIG. 2 illustrates, in one embodiment, a client writing mirrored data including tags to two storage devices.

FIG. 2 illustrates a client mirroring writes to two storage devices, according to one embodiment. Client 200 may send mirrored write commands including identical tags to both Storage Device 220 and Storage Device 260, as illustrated by arrows 210 and 215. Upon receiving the write command and tag from Client 200, Storage Device 220 may store the metadata including the write tag, in History 250. In some embodiments, Storage Device 220 may store the metadata from every write command in Client 200's mirrored write session in History 250. In other embodiments, Storage Device 220 may only maintain a small number of the more recent writes from Client 200's mirrored write session. In yet other embodiments, Storage Device 220 may discard an entry from History 250 when the data from the associated write command has been committed to Data Store 260. Similarly, Storage Device 260 may store metadata from Client 200's mirrored write session in History 290. In some embodiments, Storage Device 200 and Storage Device 260 may represent the same physical storage device. In such an embodiment, Client 200 may send mirrored data in two different write sessions to two different data objects on the storage device, as logically represented by both Storage Device 200 and Storage Device 260. Additionally, the storage device may maintain a history and session tag for each session from Client 200.

According to one embodiment, Storage Devices 220 and 260 may store the data and write tag from Client 200 in Data Stores 230 and 260, respectively. In another embodiment, Storage Device 220 and Storage Device 260 may be configured to store the write tags separately from the actual data. Storage Devices 220 may store the write tags along with other metadata about the data blocks in a separate part of Data Store 230, or may store the write tag with the actual data blocks and also in a separate metadata storage area separate from Data Store 230.

In some embodiments, Storage Device 220 may calculate Session Tag 240 from the individual write tags from Client 200. Storage Device 220 may recalculate Session Tag 240 with each new write from Client 200. In various embodiments, Storage Device 220 may calculate Session Tag 240 in different ways. For example, Storage Device 220 may combine or add the individual write tags to calculate Session Tag 240, in one embodiment. Similarly, Storage Device 220 may use the write tag from Mirrored Write 210 as a hash function argument to rehash a value for Session Tag 240. In some embodiments, the values of Session Tag 220 and Session Tag 280 may have no meaning or use other than for comparing with each other and with the values of session tags from other storage devices. In similar ways, Storage Device 260 may calculate Session Tag 280, according to various embodiments.

Figure 3:
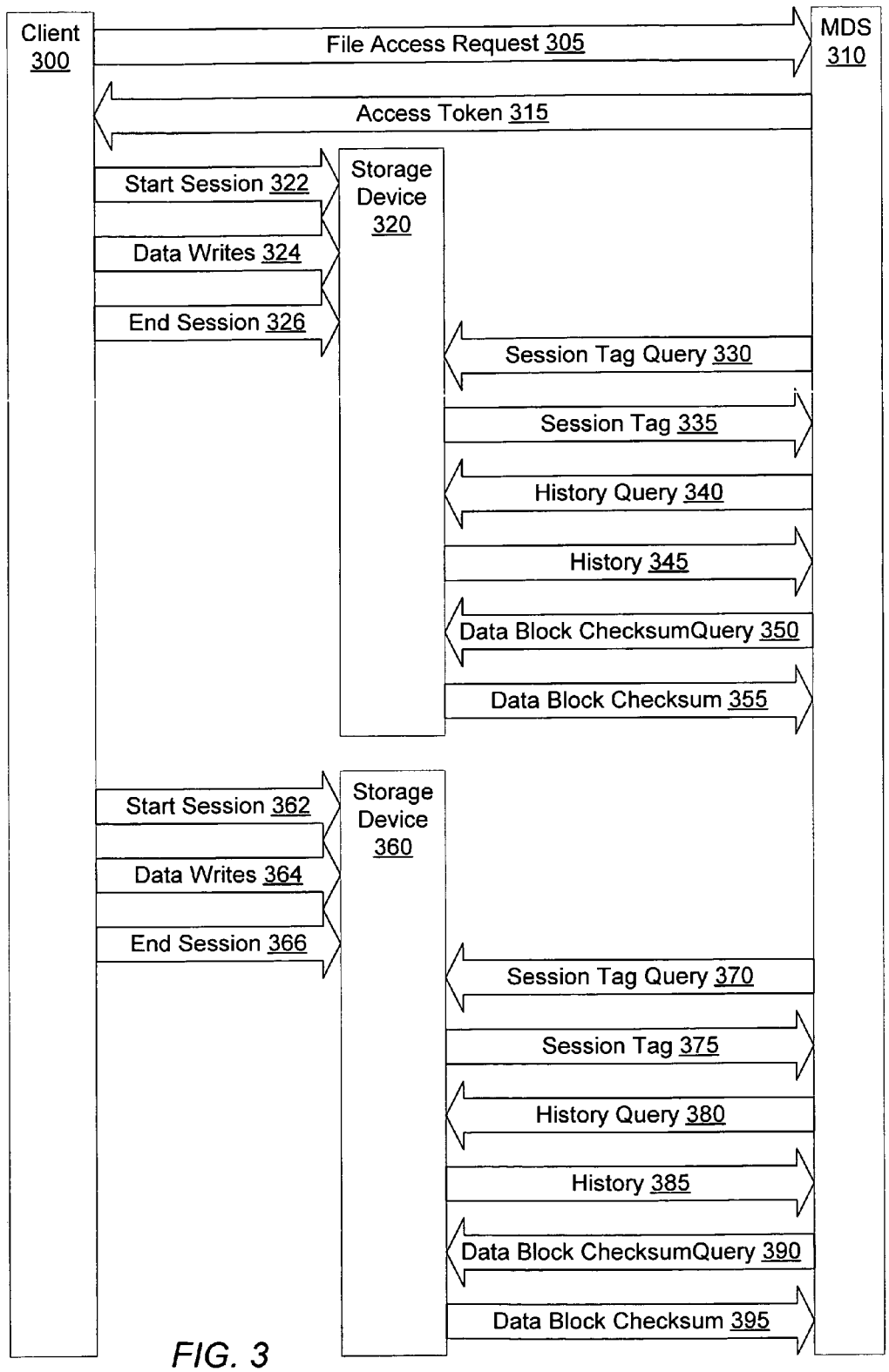
FIG. 3 illustrates the logical communications between a client, a metadata server and two storage devices, wherein the client writes mirrored data to the storage devices and the metadata server determines whether the mirrored storage devices are synchronized, according to one embodiment.

FIG. 3 illustrates, according to one embodiment, the interactions and communications used by a client, a metadata server and two storage devices to perform mirrored writes and to detect mirror inconsistencies using session tags. Client 300 may update two mirrored storage devices, Storage Device 320 and Storage Device 360. According to one embodiment, Client 300 may first request write privileges for the appropriate files or objects from MDS 310, as illustrated by File Access Request 305. In some embodiments, File Access Request 305 may involve multiple messages between Client 300 and MDS 310. For instance, Client 300 may have to separately request write privileges to each storage device. In other embodiments, Client 300 may be able to request all necessary access privileges using one message or communication. MDS 310 may respond to File Access Request 305 by returning Access Token 315 to Client 300.

After obtaining the necessary access privileges, Client 300 may begin mirroring data to the two storage devices, Storage Device 320 and Storage Device 360 and may send separate write or update commands to each storage device. In some embodiments, Client 300 may be the application creating or originating the data, while in other embodiments, Client 300 may be configured as a host application forwarding data writes from other clients to the appropriate mirrored storage devices. Client 300 may begin a mirrored write session with each storage device as illustrated by Start Session 322 and Start Session 362. For example, Start Sessions 322 and 362 may represent the opening or creating of a data file, if Storage Devices 320 and 360 are more traditional storage devices, or of an appropriate user object if Storage Devices 320 and 360 are object-based storage devices, according to different embodiments. In some embodiments, Storage Devices 320 and 360 may use Start Sessions 322 and 362 as a signal, to prepare to record metadata histories and to calculate session tags. In other embodiments, Storage Devices 320 and 360 may not prepare for histories and session tags until the first write command is received.

After opening a write session with each storage device, Client 300 may send one or more mirrored data writes to Storage Devices 320 and 360, as illustrated by Data Writes 324 and 364. As described above, Client 300 may include a write tag with each write. In one embodiment, Client 300 may calculate these write tags, while in other embodiments, the write tag may be a part of the underlying data I/O protocol. For example, if Client 300 is sending write command to an object-based storage device, the checksum already present in the object write command may be used as the write tag. As described above, a write tag may not be an actual CRC. For instance, in one embodiment, a unique ID number from a network message used to send the write command may be used as a write tag. As described above, Storage Device 320 and Storage Device 360 may update their metadata histories and session tags with each write.

After completing all mirrored writes to the two storage devices, Client 300 may close the two write sessions, as illustrated by the End Session 326 and End Session 366 arrows illustrated in FIG. 3. In one embodiment, Client 300 may end its session by closing the files or user objects opened earlier. In other embodiment, ending a session may also involve relinquishing the access token obtained earlier from MDS 310. In yet other embodiments, the sessions started by Client 300 may end in abnormal ways, such as from a device or network fault. For example, Client 300 may have a software or hardware failure causing it lock-up before completing its write sessions. In other embodiments, an access token Client 300 obtained from MDS 310 may expire before Client 300 completes all of its desired data writes, thereby prematurely ending a write session.

After the mirrored write session has ended, MDS 310 may, in one embodiment, perform a check to determine whether the mirrored images are synchronized. For instance, MDS 310 may query Storage Device 320 and Storage Device 360 for their respective session tags, as illustrated by Session Tag Queries 330 and 370. The exact nature of a session tag query may vary from embodiment to embodiment and upon the nature of Storage Devices 320 and 360. For example, in one embodiment, MDS310 may utilize a predetermined storage API to query a storage device for a session tag. Alternatively, MDS 310 may send such a query as a network message, while in yet other embodiments, may use one or more remote procedure calls to query the two storage devices. When requesting a session tag, a MDS 310 may provide information identifying Client 300, or the mirrored data objects, or other information necessary to specify the particular session tag that is being requested.

According to some embodiments, Storage Devices 320 and 360 may return their session tags to MDS 310 in response to such session tag requests. In one embodiment, MDS 310 may not request the session tags, but instead Storage Devices 320 and 360 may send their respective session tags to MDS 310 at the end of a mirrored write session. MDS 310 may then compare the session tags to determine if the mirrored devices are synchronized, regarding Client 300's write sessions. If MDS 310 determines that the session tags are not the same, MDS 310 may query Storage Devices 320 and 360 for their respective histories from Client 300's write session, as illustrated by History Query 340 and History Query 380. As with the session tag requests, the specific nature of a history request may vary according to different embodiments.

As described above, these histories may vary in nature and as to the number of entries according to various embodiments. Storage Devices 320 and 360 may return their respective histories to MDS 310 as illustrated by History 345 and History 385. MDS 310 may then examine the histories to attempt to determine why the two session histories where not equal. MDS 310 may look for various discrepancies between the two histories, according to various embodiments. For example, in one embodiment, MDS 310 may compare the number of entries in each history to ensure that each storage device received every write command from Client 300. In another example, MDS 310 may compare the ordering of the entries to ensure that the mirrored writes were received and stored in the same order.

If MDS 310 cannot determine the cause of the session tag discrepancy from examining the histories from the storage devices, it may then request the checksum from individual data blocks from the data stores on the two storage devices, according to one embodiment. MDS 310 may obtain and compare the checksum from respective data blocks from each storage device and attempt to find one or more specific data blocks that are inconsistent between the two storage devices. MDS 310 may issue Block Data Checksum Query 350 to Storage Device 320 and may issue Block Data Checksum Query 390 to Storage Device 360 to request specific data block checksums. In one embodiment, MDS 310 may be able to request all the appropriate data block checksums together, while in other embodiments, MDS 310 may have to request the checksums individually. In response to MDS 310's data block checksum queries, Storage Device 320 and Storage Device 360 may provide the requested checksums to MDS 310, as illustrated by Data Block Checksums 355 and 395.

When comparing and finding inconsistent data blocks, MDS 310 may or may not attempt to synchronize the data between the storage devices, depending upon the exact nature of the data discrepancy and according to various embodiments. For example, in some embodiments, MDS 310 may be able to recover and/or replay the appropriate data writes to correct the inconsistency. In other embodiments, MDS 310 may report and log the specific nature and information that it discovered while examining the session tags, the histories and the individual data block tags.

While FIG. 3 illustrates an embodiment wherein MDS 310 performs its mirror consistency comparison at the end of Client 300's write sessions, in other embodiments MDS 310 may compare the session tags from Storage Device 320 and Storage Device 360 occasionally throughout Client 300's mirrored write session. For instance, in one embodiment, MDS 310 may compare the session tags at preset time intervals throughout Client 300's write session. In other embodiments, Storage Devices 320 and 360 may be configured to notify MDS 310 that their histories have reached some predetermined capacity. In response, MDS 310 may request and compare session tags. In such an embodiment, MDS 310 may then instruct the two storage devices to discard the current contents of their histories if the session tags match. Alternatively, MDS 310 may be configured to re-synchronize the two storage devices if the session tags disagree. In yet another embodiment, Storage Devices 320 and 360 may periodically exchange their session tags without involving the MDS 310, and perform the same operations of coordinating session history purging described above by agreeing that the histories and tags match.

Figure 4:
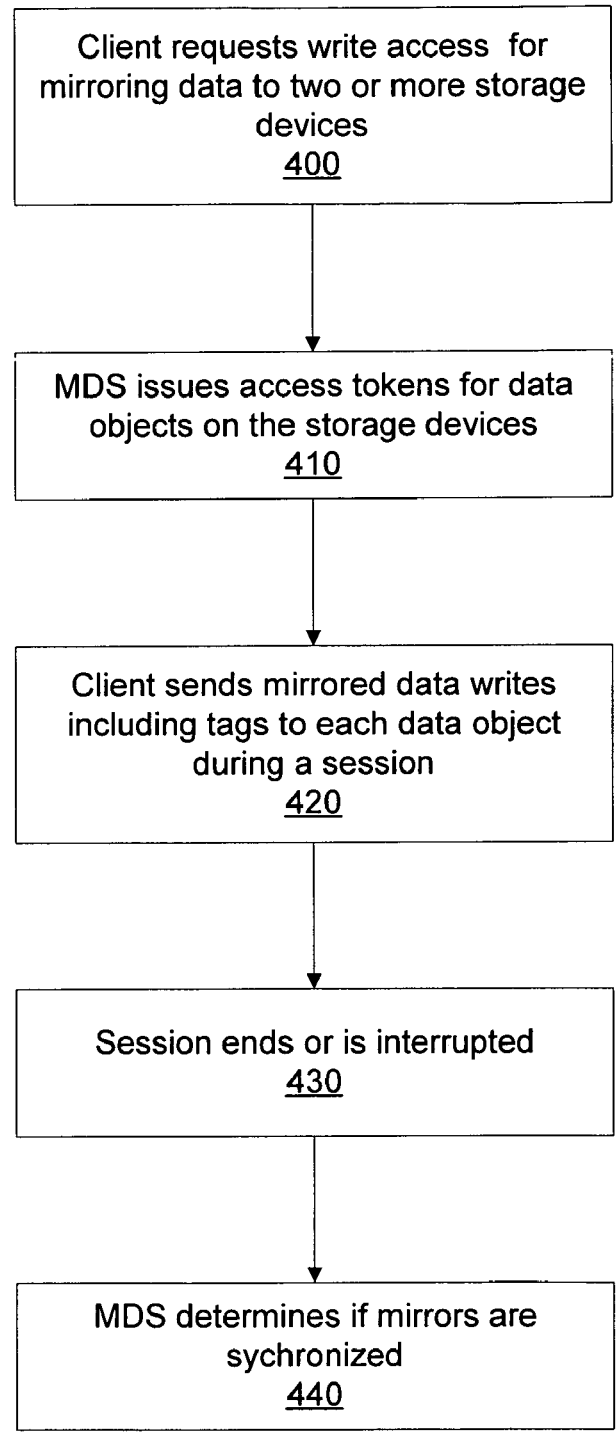
FIG. 4 is flow chart illustrating, according to one embodiment, a method for determining if mirrored images are synchronized.

FIG. 4 is a flowchart illustrating, according to one embodiment, a method for performing mirrored writes and for determining if the mirrors are consistent afterwards. For example, a client, such as Client 300 described above, may need to update two or more mirrored storage devices, such as Storage Devices 320 and 360, also described above. As illustrated in block 400, the client may request write access for mirroring data to the storage devices. In one embodiment, requesting write access for mirroring may be identical to requesting write access for any other reason. In another embodiment however, requesting write access for mirroring may involve a distinct command or message to allow a metadata server, such as MDS 310, to take whatever actions may be necessary to prepare for checking the data consistency of the mirrors after the client write sessions. In response to Client 300 requesting write access for mirroring data, MDS 310 may issue access tokens granting access for appropriate objects on the storage devices, as illustrated in block 410. In some embodiments, access tokens granted for mirroring data may be different from access tokens granting general write access.

After receiving the access tokens from a metadata server, the client may send one or more mirrored data writes including tags to each data object during a session, as illustrated by block 420. In some embodiments, Client 300 may open a write session by opening or creating the appropriate file or data object on each storage device before sending any write commands. In other embodiments, a client may use a different open or create command to start a mirrored write session. In such an embodiment, the storage device may perform various tasks to prepare for the data writes with tags to follow. For example, Storage Device 220 may allocate memory for a metadata history, such as History 250, and a session tag, such as Session Tag 240. In certain embodiments, the client may have to perform additional tasks to properly initiate a mirrored write session with a storage device.

According to one embodiment illustrated by FIG. 4, a client may include a write tag with mirrored writes. As described above, such a tag may be the value calculated by performing a cyclic-redundancy-check on the data to be written, in one embodiment. In another embodiments, it may be a unique identifier or randomly generated. When a storage device receives a write command including a tag during a mirrored write session, the storage device may save the tag in a session history and may calculate a session tag, as described above, and discussed regarding FIG. 5, below.

After sending one or more mirrored data writes including tags to each relevant data object, the client may end the mirrored write session. In some embodiments the client will purposefully end the session by closing the open files for data objects, and may perform additional tasks as well, according to various embodiments. In other embodiments, the session may end abnormally, due to software or hardware fault, network problem, access token expiration, or other condition. According to some embodiments, when the mirrored write session ends, a metadata server may perform a mirror consistency check, as illustrated by block 440. There are numerous ways for a metadata server to recognize the end of a client's mirrored write session, according to various embodiments. In one embodiment, the client may relinquish the access tokens previously granted. In another embodiment, the storage device may inform the metadata server that the client has ended the mirrored write session, perhaps providing session tag at the same time. In yet other embodiments, the metadata server may query the storage device to determine whether the session has ended.

Figure 5:
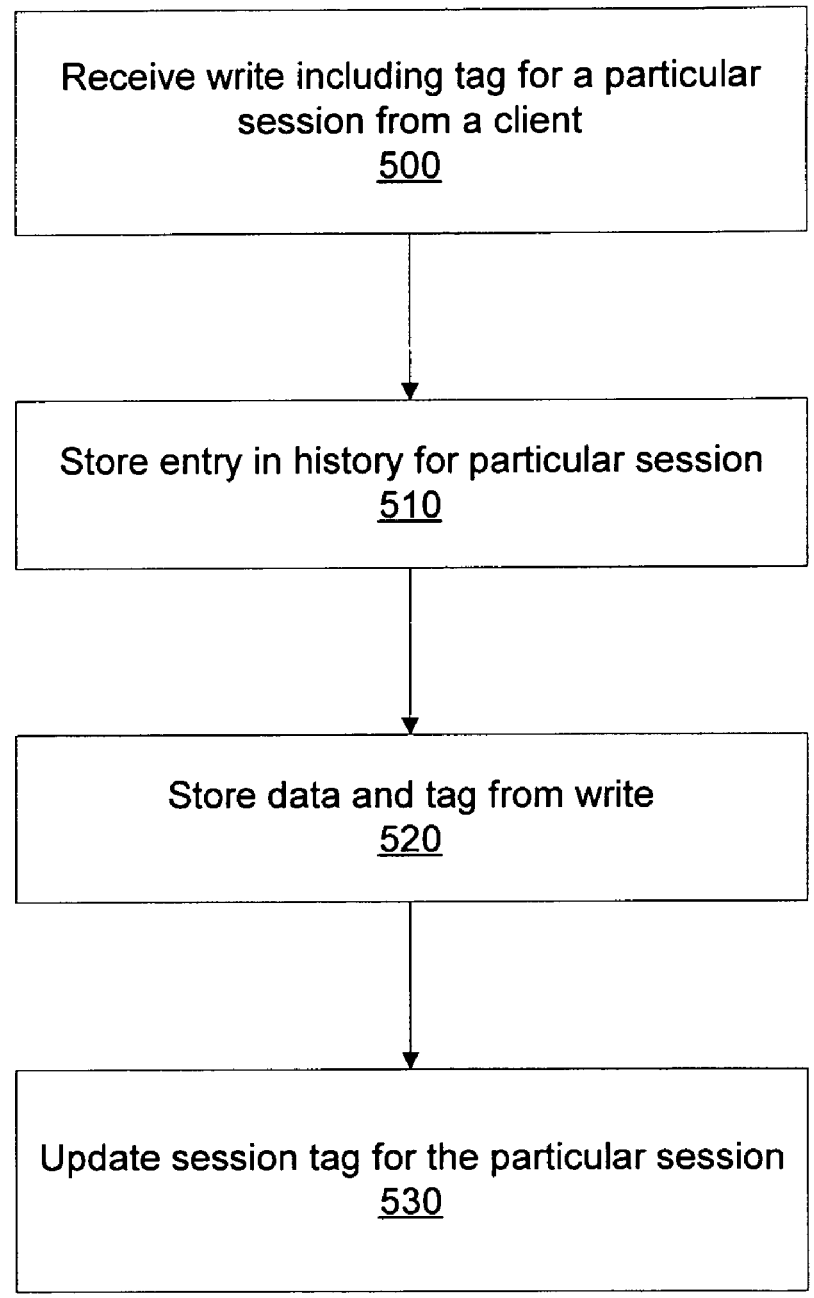
FIG. 5 is a flow chart illustrating a method for a storage device to store tags for use in detecting mirror inconsistencies, in one embodiment.

FIG. 5 is a flowchart illustrating a method for a storage device to store write tags and calculate session tags for later mirror comparison, according to one embodiment. A client, after acquiring the appropriate access privileges and opening a mirrored write session, as described above, may send mirrored data writes including tags to storage devices. In one embodiment, when a storage device receives a write including a tag as part of a particular session from a client, as illustrated by block 500, it may store an new entry in a history for that particular session, as illustrated by block 510. For example, Storage Device 220 may store the metadata, including the write tag, from the recent data writes of the session, according to one embodiment. The number of entries kept in a storage devices session history may vary depending upon the number of open mirrored sessions, the amount of available memory, the frequency of periodic session tag comparisons by a metadata server, and the expected latency of committing the client's data write to storage, according to various embodiments.

In another embodiment, Storage Device 220 may store the metadata, including the tag, for all data writes in the session until a metadata periodically compares the session tags across the mirrored storage devices. In such an embodiment, the metadata server may periodically request and compare the session tags for the client's session from the mirrored storage devices and if the sessions are synchronized, inform the storage devices. The storage devices may then discard the entries from the session history that were stored prior to the comparison.

As illustrated by block 520, a storage device may store the data and tag from the mirrored write, in certain embodiments. In one embodiment, the data and tag may be stored together, but in another embodiment, they may be stored separately. In other embodiments, the tag may be stored together with other metadata about the write in a location separate from the data. In one embodiment, the tag from the data writes for a particular session may be cached in memory so they may be easily provided to a metadata server for examination and comparison.

According to one embodiment, a storage device may, after storing the data and tag, update a session tag for the particular session, as illustrated by block 530. As described above, the session tag may be calculated in various ways, according to different embodiments. For example, a storage device may combine or add individual write tags, accounting for overflow and wrapping, in one embodiment. Similarly, in another embodiment, a storage device may use the write tag from a mirrored write as a hash function argument to re-hash a session tag.

Figure 6:
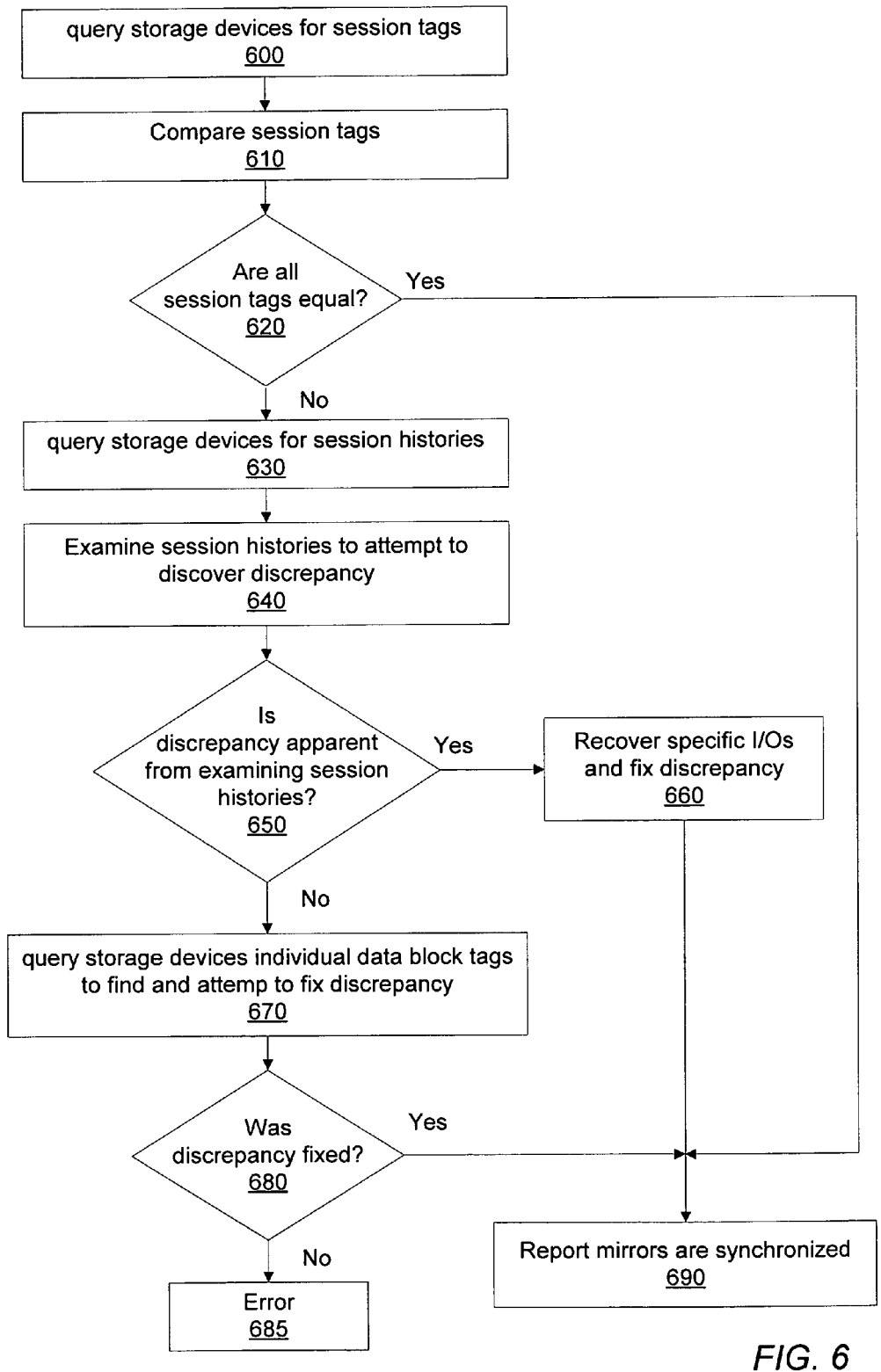
FIG. 6 is a flow chart illustrating, according to one embodiment, a method for a metadata server to detect mirror inconsistencies.

FIG. 6 is a flowchart illustrating a method, in one embodiment, for a metadata server to determine not only whether mirrored data across two or more data storage devices are consistent, but also the cause of the discrepancy and to attempt to re-synchronize the data across the storage devices. According to one embodiment, a metadata server may periodically during a mirrored write session, or when the session ends for any of various reasons discussed above, query the storage devices involved for their session tags, as illustrated by block 600. After receiving the session tags in reply, the metadata server may compare the session tags, as illustrated in block 610. If the tags are equal, as illustrated by the positive exit from decision block 620, the metadata server may then conclude and report that the mirrored devices are synchronized in relation to the data written in that particular write session, as illustrated in block 690.

If however the metadata server determines that the session tags are not equal, as illustrated by the negative exit from decision block 620, the metadata server may request the session histories from the storage devices, as illustrated in block 630. After obtaining the histories from the storage devices in reply, the metadata server may examine the session histories and attempt to discover the cause of the discrepancy, as illustrated in block 640. For instance, according to one embodiment, a metadata server may be able to identify a specific write that needs to be recovered for a specific storage device, or that one or more data caches for the client need to be flushed. If, as illustrated by the positive exit from decision block 650, a metadata server is able to determine the cause of the discrepancy from examining the session histories, the metadata server may recover or replay the appropriate I/Os to resolve the discrepancy, thereby re-synchronizing the mirrored storage devices. After such a re-synchronization, the metadata server may, in one embodiment, conclude and/or report that the mirrors are now synchronized, as illustrated by block 690.

If, however, the metadata server is not able to discern the cause of the session tag discrepancy by examining the session histories, as illustrated by the negative exit from decision block 650, the metadata server may, in one embodiment, query each storage device for individual tags for data blocks written during the mirrored write session and attempt to fix the discrepancy using them, as illustrated by block 670. In one embodiment, the metadata server may step through each data block in turn, comparing the respective tags from the various storage devices until the divergence is encountered. If the metadata server is able to correct the problem and synchronize the mirrors based on the individual data block tags, as illustrated by the positive exit from decision block 680, the metadata server may report the fact that mirrors are now synchronized, as illustrated by block 690. Whereas, if the metadata server is unable to fix the synchronization problem, as illustrated by the negative exit from decision block 680, the metadata server may then perform various error tasks as indicated by block 685, according to one embodiment.

Figure 7:
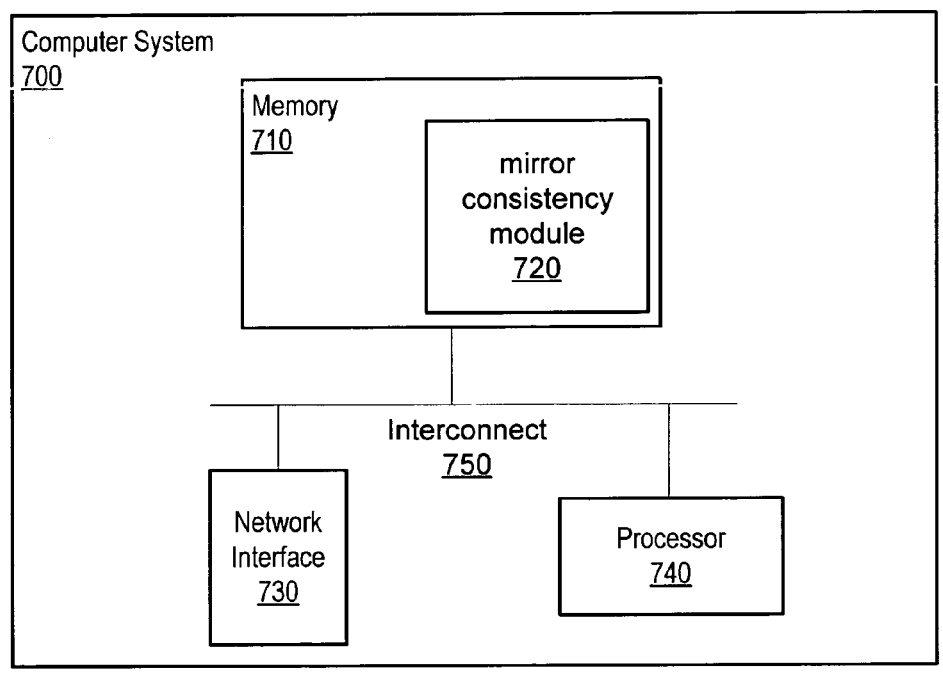
FIG. 7 is a block diagram illustrating, according to one embodiment, a computer system that may be configured to implement detection of mirror inconsistencies using tags.

FIG. 7 illustrates a computing system capable of detecting and correcting of mirror inconsistencies using tags as described above and according to various embodiments. Computer System 700 may be any of various types of devices, including, but not limited to, a personal computer system, desktop computer, laptop or notebook computer, mainframe computer system, workstation, network computer, or in general any type of networkable computing device. Computer System 700 may include at least one Processor 740. Processor 740 may couple across one or more interconnects, such as Interconnect 750, to Memory 710 and to one or more network interfaces, such as Network Interface 730. Network Interface 730 may be any of various types of interfaces configured to couple with and communicate over Network 100 illustrated in FIG. 1 and described above. In some embodiments, Computer System 700 may include more than one network interface of the same or different types, as described above.

Memory 710 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, Memory 710 may include program instructions configured to detect and correct mirror inconsistencies using tags as described above. In certain embodiments Memory 710 may include program instructions configured to implement a mirror consistency module as illustrated by block 720. Such a mirror consistency module may be configured to perform at least some portion or all of the mirror inconsistency detection and correction processing described herein. In other embodiments Memory 710 may include program instructions configured to implement a server or a storage device, either of which may be configured to detect and/or correct mirror inconsistencies using tags as described above.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
during a session, a client performing mirroring writes to two or more storage devices, wherein each write comprises data and a write tag;
each of the two or more storage devices maintaining a session tag for the session, wherein the session tag is calculated from the write tag included with each said write; and
comparing the session tag from each of the two or more storage devices to determine if the same data has been written by said client during the session to each of the two or more storage devices.

2. The method of claim 1, further comprising each of the two or more storage devices maintaining a history of recent writes from the client during the session, wherein the history includes the write tag for each recent write.

3. The method of claim 2, further comprising, in response to said comparing, determining that the session tags from the two or more storage devices are not all equal; and examining said histories from the two or more storage devices to attempt to determine a cause for a discrepancy in the session tags.

4. The method of claim 3, further comprising, in response to said examining, identifying one or more writes as the cause for the discrepancy in the session tags, and recovering the identified writes to synchronize the two or more storage devices.

5. The method of claim 3, further comprising each of the two or more storage devices storing the data and write tag for each said write.

6. The method of claim 5, further comprising, in response to said examining, failing to determine the cause for the discrepancy in the session tags, and examining the write tags stored for each said write in each of the two or more storage devices to attempt to determine the cause for the discrepancy in the session tags.

7. The method of claim 1, further comprising:
one or more additional clients mirroring writes to the two or more storage devices, wherein each write comprises data and a write tag; and
each of the two or more storage devices maintaining a session tag for each client, wherein the session tag is calculated from the write tag included with each said write.

8. The method of claim 1, wherein said comparing is performed by a server when the session has ended.

9. The method of claim 1, wherein said comparing is performed periodically or aperiodically by a server during the session.

10. The method of claim 1, wherein the write tag comprises a checksum of the data being written.

11. The method of claim 1, wherein the write tag comprises a globally unique random identifier.

12. The method of claim 1, wherein the write tag comprises a cryptographic hash based on the data being written.

13. A device, comprising:
a processor; and
a memory coupled to the processor, wherein the memory comprises program instructions configured to:
receive mirroring writes from a client during a session, wherein each write comprises data and a write tag; and
maintain a session tag for the session, wherein the session tag is calculated from the write tag included with each said write.

14. The device of claim 13, wherein the program instructions are further configured to maintain a history of recent writes from the client during the session, wherein the history includes the write tag for each recent write.

15. The device of claim 14, wherein the program instructions are further configured to store the data and write tag for each said write.

16. The device of claim 15, wherein the program instructions are further configured to:
receive mirroring writes from one or more additional clients, wherein each write comprises data and a write tag; and
maintain a session tag for each client, wherein the session tag is calculated from the write tag included with each said write.

17. The device of claim 13, wherein the write tag comprises a checksum of the data being written.

18. The device of claim 13, wherein the write tag comprises a globally unique random identifier.

19. The device of claim 13, wherein the write tag comprises a cryptographic hash based on the data being written.

20. A device, comprising:
a processor; and
a memory coupled to the processor, wherein the memory comprises program instructions configured to compare respective session tags from each of two or more storage devices to determine if the same data has been written by a client during a mirroring session to each of the two or more storage devices, wherein each of the respective session tags is calculated from a respective write tag included with each of one or more writes comprising said data written by the client.

21. The device of claim 20, wherein in response to said comparing the program instructions are further configured to:
determine that the session tags from the two or more storage devices are not all equal; and
examine respective histories of recent writes to each of the two or more storage devices to attempt to determine a cause for a discrepancy in the session tags.

22. The device of claim 21, wherein in response to said examining the program instructions are further configured to:

identify one or more writes as the cause for the discrepancy in the session tags; and recover the identified writes to synchronize the two or more storage devices.

23. The device of claim 22, wherein in response to said examining the program instructions are further configured to:

fail to determine the cause for the discrepancy in the session tags; and examine respective write tags stored for each said write in each of the two or more storage devices to attempt to determine the cause for the discrepancy in the session tags.

24. The device of claim 20, wherein each respective write tag comprises a checksum of corresponding data being written.

25. The device of claim 20, wherein each respective write tag comprises a globally unique random identifier.

26. The device of claim 20, wherein each respective write tag comprises a cryptographic hash based on corresponding data being written.

27. A system, comprising:

a client;

a server;

two or more storage devices;

wherein the client is configured to mirror writes to the two or more storage devices during a session, wherein each write comprises data and a write tag;

wherein each of the two or more storage devices is configured to:

maintain a session tag for the session, wherein the session tag is calculated from the write tag included with each said write;

wherein the server is configured to:

compare the session tag from each of the two or more storage devices to determine if the same data has been written by said client during the session to each of the two or more storage devices.

28. The system of claim 27, wherein the write tag comprises a checksum of the data being written.

29. The system of claim 27, wherein the write tag comprises a globally unique random identifier.

30. The system of claim 27, wherein the write tag comprises a cryptographic hash based on the data being written.

* * * * *